United States Patent [19]
Wilkinson et al.

[11] Patent Number: 5,432,021
[45] Date of Patent: * Jul. 11, 1995

[54] METHOD AND APPARATUS FOR OXIDIZING CARBON MONOXIDE IN THE REACTANT STREAM OF AN ELECTROCHEMICAL FUEL CELL

[75] Inventors: David P. Wilkinson, North Vancouver; Henry H. Voss, West Vancouver; James Dudley, Port Moody; Gordon J. Lamont, Vancouver; Vesna Basura, Burnaby, all of Canada

[73] Assignee: Ballard Power Systems Inc., North Vancouver, Canada

[ * ] Notice: The portion of the term of this patent subsequent to Oct. 9, 2009 has been disclaimed.

[21] Appl. No.: 126,525

[22] Filed: Sep. 24, 1993

Related U.S. Application Data

[63] Continuation-in-part of Ser. No. 959,070, Oct. 9, 1992, Pat. No. 5,316,747.

[51] Int. Cl.⁶ ............................................. H01M 8/04
[52] U.S. Cl. ......................................... 429/17; 429/34; 429/19; 429/38; 422/177; 423/247; 423/437 M
[58] Field of Search ................ 422/177, 196; 423/247, 423/246, 437, 656; 429/17, 19, 34, 38, 39, 26

[56] References Cited

U.S. PATENT DOCUMENTS

| | | | |
|---|---|---|---|
| 3,088,919 | 5/1963 | Brown, Jr. et al. | 423/347 |
| 3,216,782 | 11/1965 | Cohn | 423/247 |
| 3,216,783 | 11/1965 | Cohn | 423/247 |
| 3,615,164 | 10/1971 | Baker et al. | 423/247 |
| 3,631,073 | 12/1971 | Cohn et al. | 252/443 |
| 3,663,162 | 5/1972 | Randhava | 423/247 |
| 3,852,169 | 12/1974 | Kring et al. | 204/153.16 |
| 4,046,956 | 9/1977 | Fanciullo | 429/20 |
| 4,234,317 | 11/1980 | Lucas et al. | 436/71 |
| 4,293,315 | 10/1981 | Sederquist | 48/94 |
| 4,309,359 | 1/1982 | Pinto | 429/16 |
| 4,373,452 | 2/1983 | Van Dewoestine | 422/177 |
| 4,604,275 | 8/1986 | Murib | 423/437 M |
| 4,830,844 | 5/1989 | Kolts | 423/437 M |
| 4,906,448 | 3/1990 | Sauvion et al. | 423/437 M |
| 4,910,099 | 3/1990 | Gottesfeld | 429/13 |
| 4,988,583 | 1/1991 | Watkins et al. | 429/30 |
| 5,017,357 | 5/1991 | Kolts et al. | 423/437 M |
| 5,061,464 | 10/1991 | Cordonna, Jr. et al. | 423/213.5 |
| 5,079,379 | 1/1992 | Braun et al. | 422/145 |
| 5,108,849 | 4/1992 | Watkins et al. | 429/30 |
| 5,176,966 | 1/1993 | Epp et al. | 429/26 |
| 5,252,410 | 10/1993 | Wilkinson et al. | 429/34 |
| 5,316,747 | 5/1994 | Pow et al. | 423/247 |

FOREIGN PATENT DOCUMENTS 1305212 7/1992 Canada .................. H01M 8/22

OTHER PUBLICATIONS

"Selective Oxidation of Carbon Monoxide", *Industrial And Engineering Chemistry*, vol. 52, No. 10, pp. 841–844. Brown, Jr. et al. 1960.

"Selective Oxidation of Carbon Monoxide at a Low Temperature", *Indian Journal of Technology*, vol. 15, pp. 403–407. Chatterjee et al. Sep. 1977.

"Selective $CO_2$ Oxidation Process Raises $NH_3$ Yield", *Industrial Safety*, vol. 20, pp. 165–170. Bonacci et al., 1978.

*Primary Examiner*—Robert J. Warden
*Assistant Examiner*—Hien Tran
*Attorney, Agent, or Firm*—McAndrews, Held & Malloy, Ltd.

[57] ABSTRACT

A method and apparatus oxidizes the carbon monoxide present in an incoming reactant fuel stream and/or carbon monoxide produced by the reverse water-shift reaction to carbon dioxide in a reactant stream introduced to an electrochemical fuel cell. The reactant stream comprises hydrogen, carbon dioxide and carbon monoxide. A first oxygen-containing gas stream is introduced into the reactant stream through a first port disposed between the reactant stream inlet and the reactant stream outlet. A further oxygen-containing gas stream is introduced into the reactant stream through at least one secondary port located between the first port and the reactant stream outlet.

10 Claims, 13 Drawing Sheets

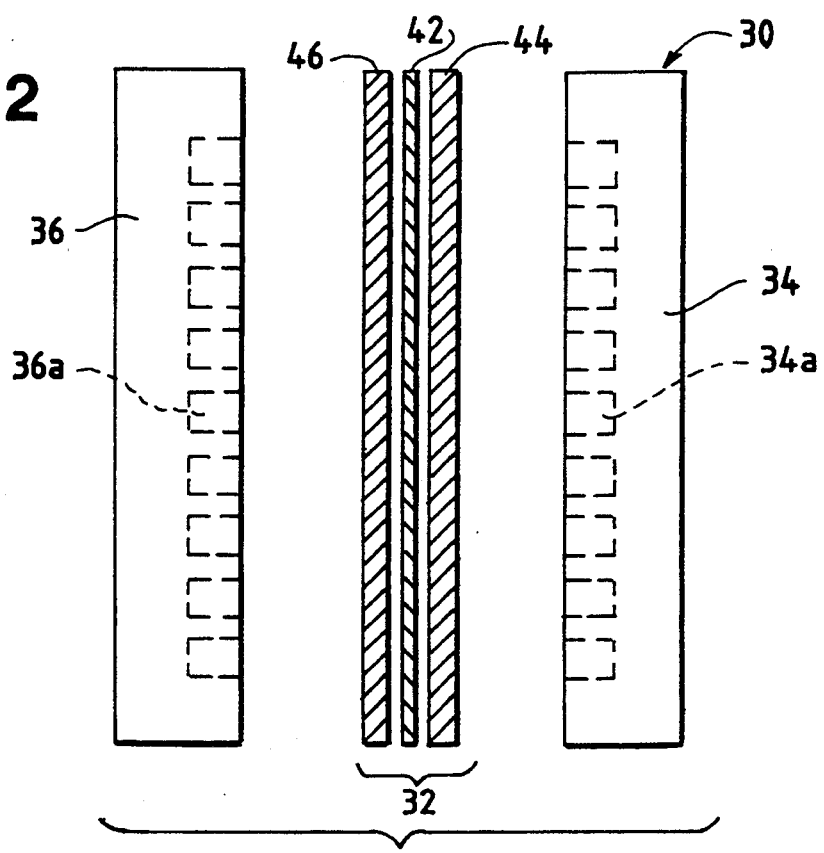
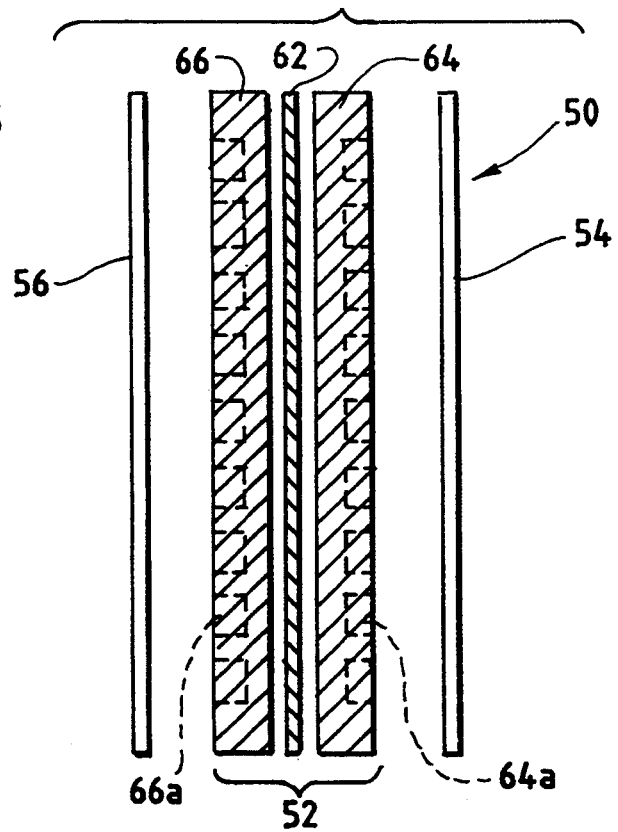

METHOD AND APPARATUS FOR OXIDIZING CARBON MONOXIDE IN THE REACTANT STREAM OF AN ELECTROCHEMICAL FUEL CELL

CROSS-REFERENCE TO RELATED APPLICATIONS

This application is a continuation-in-part of U.S. patent application Ser. No. 07/959,070 filed Oct. 9, 1992, now U.S. Pat. No. 5,316,747 entitled "Method And Apparatus For The Selective Oxidation Of Carbon Monoxide In A Hydrogen-Containing Gas Mixture." The '070 application, incorporated herein by reference in its entirety, describes the selective oxidation of carbon monoxide present in a mixture of gases, including hydrogen, to carbon dioxide by introducing oxygen or an oxygen-containing gas mixture at locations along the latter portion of the reaction chamber of an isothermal reactor.

FIELD OF THE INVENTION

The present invention relates to the treatment of the reactant gas streams of electrochemical fuel cells. More particularly, the present invention relates to a method and apparatus for oxidizing the carbon monoxide present in the incoming reactant fuel stream and/or the carbon monoxide produced by the reverse water shift reaction in the reactant stream of an electrochemical fuel cell.

BACKGROUND OF THE INVENTION

Electrochemical fuel cells convert fuel and oxidant to electricity and reaction product. In electrochemical fuel cells employing hydrogen as the fuel and oxygen as the oxidant, the reaction product is water. Such fuel cells generally employ a membrane electrode assembly ("MEA") consisting of a solid polymer electrolyte or ion exchange membrane disposed between two electrodes formed of porous, electrically conductive sheet material, typically carbon fiber paper. The MEA contains a layer of catalyst, typically in the form of finely comminuted platinum, at each membrane/electrode interface to induce the desired electrochemical reaction. The electrodes are electrically coupled to provide a path for conducting electrons between the electrodes through an external load.

At the anode, the fuel permeates the porous electrode material and reacts at the catalyst layer to form cations, which migrate through the membrane to the cathode. At the cathode, the oxygen-containing gas supply reacts at the catalyst layer to form anions. The anions formed at the cathode react with the cations to complete the electrochemical reaction and form a reaction product.

In electrochemical fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of hydrogen ions from the anode to the cathode. In addition to conducting hydrogen ions, the membrane isolates the hydrogen-containing fuel stream from the oxygen-containing oxidant stream. At the cathode, oxygen reacts at the catalyst layer to form anions. The anions formed at the cathode react with the hydrogen ions that have crossed the membrane to complete the electrochemical reaction and form liquid water as the reaction product.

In conventional fuel cells, the MEA is interposed between two fluid-impermeable, electrically conductive plates, commonly referred to as the anode and the cathode plates, respectively. The plates are typically formed from graphite, a graphite composite such as graphite/epoxy, but can also be formed from other suitable electrically conductive materials. The plates serve as current collectors, provide structural support for the porous, electrically conductive electrodes, provide means for carrying the fuel and oxidant to the anode and cathode, respectively, and provide means for removing water formed during operation of the fuel cell. When the channels are formed in the anode and cathode plates, the plates are referred to as fluid flow field plates. When the anode and cathode plates overlay channels formed in the anode and cathode porous material, the plates are referred to as separator plates.

Reactant feed manifolds are generally formed in the anode and cathode plates, as well as in the MEA, to direct the fuel (typically a substantially pure hydrogen gas stream or hydrogen-containing reformate gas stream from the conversion of hydrocarbons such as methanol or natural gas) to the anode and the oxidant (typically substantially pure oxygen or oxygen-containing gas) to the cathode via the channels formed in either the fluid flow field plates or the electrodes themselves. Exhaust manifolds are also generally formed in the anode and cathode plates, as well as the MEA, to direct the unreacted components of the fuel and oxidant streams, as well as water accumulated at the cathode, from the fuel cell.

Multiple fuel cell assemblies comprising two or more anode plate/MEA/cathode plate combinations, referred to as a fuel cell stack, can be connected together in series (or in parallel) to increase the overall power output as required. In such stack arrangements, the cells are most often connected in series, wherein one side of a given fluid flow field or separator plate is the anode plate for one cell, the other side of the plate is the cathode plate for the adjacent cell, and so on.

Perfluorosulfonic ion exchange membranes, such as those sold by DuPont under its NAFION trade designation, have been used effectively in electrochemical fuel cells. Fuel cells employing Perfluorosulfonic cation exchange membranes require accumulated water to be removed from the cathode (oxidant) side, both as a result of the water transported across the membrane with cations and product water formed at the cathode from the electrochemical reaction of hydrogen cations with oxygen. An experimental perfluorosulfonic ion exchange membrane, sold by Dow Chemical Company under the trade designation XUS 13204.10, appears to have significantly less water transported with hydrogen cations across the membrane. Fuel cells employing the Dow experimental membrane thus tend to accumulate less on the cathode (oxidant) side, as the accumulated water at the cathode is essentially limited to product water formed from the electrochemical reaction of hydrogen and oxygen.

Recently, efforts have been devoted to identifying ways to operate electrochemical fuel cells using other than pure hydrogen as the fuel. Fuel cell systems operating on pure hydrogen are generally disadvantageous because of the expense of producing and storing pure hydrogen gas. In addition, the use of liquid fuels is preferable to pure, bottled hydrogen in mobile and vehicular applications of electrochemical fuel cells.

Recent efforts have focused on the use of an impure hydrogen fuel stream obtained from the chemical conversion of hydrocarbon fuels to hydrogen and carbon byproducts. However, to be useful for fuel cells and other similar hydrogen-based chemical applications, hydrocarbon fuels must be efficiently converted to relatively pure hydrogen with a minimal amount of undesirable chemical byproducts, such as carbon monoxide.

Conversion of hydrocarbons to hydrogen is generally accomplished through the steam reformation of a hydrocarbon such as methanol in a reactor sometimes referred to as a reformer. The hydrogen-containing stream exiting the reformer is generally referred to as the reformate stream. The steam reformation of methanol is represented by the following chemical equation:

$$CH_3OH + H_2O + heat \rightleftharpoons 3H_2 + CO_2 \qquad (1)$$

Due to competing reactions, the initial gaseous mixture produced by steam reformation of methanol typically contains about 65% to about 75% hydrogen, about 10% to about 25% carbon dioxide, as well as from about 0.5% to about 20% by volume of CO, all on a dry basis (in addition, water vapor can be present in the gas stream). The initial gas mixture produced by the steam reformer can be further processed by a shift reactor (sometimes called a shift converter) to reduce the CO content to about 0.2%–2% by volume, on a dry basis. The catalyzed reaction occurring in the shift converter is represented by the following chemical equation:

$$CO + H_2O \rightleftharpoons CO_2 + H_2 \qquad (2)$$

Even after a combination of steam reformer/shift converter processing, the product gas mixture will have minor amounts of CO and various hydrocarbon species, typically about 5% or less by volume, on a dry basis, of the total product mixture.

In low-temperature, hydrogen-based fuel cell applications, the presence of CO in the inlet fuel stream, even at the 0.1% to 1% level, is generally unacceptable. In solid polymer electrolyte fuel cells, the electrochemical reaction is typically catalyzed by an active catalytic material comprising a noble metal such as platinum. Carbon monoxide adsorbs preferentially to the surface of platinum, particularly at temperatures below about 150° C., effectively poisoning the catalyst, and significantly reducing the efficiency of the desired electrochemical hydrogen oxidation reaction. A steam reformer/shift converter process can be used to reduce the amount of CO in the hydrogen-containing reformate gas stream to less than about 100 parts per million (ppm). In order to employ such a CO-containing reformate stream as the fuel stream for a fuel cell, the fuel cell must first be able to handle (i.e., the catalyst present in the MEAs cannot be poisoned by) the CO present in the reformate stream. In addition to the CO content of the reformate stream, CO can also be produced in the fuel cell by the reverse water shift reaction:

$$CO_2 + H_2 \rightleftharpoons CO + H_2O \qquad (3)$$

In typical reformate fuel streams, the equilibrium concentration of CO from this reaction is about 100 ppm near room temperature.

The present method and apparatus oxidizes the carbon monoxide present in the incoming reactant stream of a fuel cell and/or produced by the reverse water shift reaction (reaction (3) above). The oxidation of carbon monoxide is particularly important where the electrocatalyst promotes the reverse water shift reaction, as is the case with platinum-containing catalysts.

Watkins et al. Canadian Patent No. 1,305,212 entitled "Method for Operating a Fuel Cell on Carbon Monoxide Containing Fuel Gas" discloses the oxidation of carbon monoxide present in a fuel gas introduced to a low-temperature, solid polymer electrolyte fuel cell which employs a noble metal catalyst, such as platinum, rhodium or ruthenium, in the anode. The method involves (a) reacting the fuel gas with an oxygen-containing gas, (b) contacting the resulting fuel gas mixture with a suitable catalyst to selectively convert carbon monoxide to carbon dioxide and thereby reduce carbon monoxide levels in the fuel gas to trace amounts, and (c) feeding the resulting substantially carbon monoxide-free fuel gas to the fuel cell.

Gottesfeld U.S. Pat. No. 4,910,099 entitled "Preventing CO Poisoning In Fuel Cells" discloses the injection of oxygen ($O_2$) into the fuel stream, before introducing the fuel stream to the fuel cell, in order to remove CO present in the reformate fuel stream fed to the fuel cell. The oxygen so injected is in the form of either substantially pure $O_2$ or oxygen-containing air.

Watkins' selective oxidation of carbon monoxide to carbon dioxide and Gottesfeld's injection of oxygen into the reformate fuel stream prior to introducing the fuel stream to the fuel cell, both effectively remove CO initially present in the fuel stream. However, the removal of CO upstream of the fuel cell will not affect the further production of CO within the reactant fuel stream of the fuel cell by the reverse water shift reaction. In this regard, the removal of CO from the fuel stream by selective oxidation and/or the initial injection of oxygen, will promote the production of CO by the reverse water shift reaction to produce CO (i.e., reaction (3) above will be driven to the right) because of the substantial presence of carbon dioxide and hydrogen in the fuel stream, as well as the presence of the platinum electrocatalyst in the fuel cell. In order to effectively remove CO produced in the reactant stream of the fuel cell, oxidant (either substantially pure oxygen or oxygen-containing air) should be introduced, preferably in a substantially uniform manner, across the active area of the fuel cell in which electrocatalyst is present. The uniform introduction of oxidant is particularly effective for fuel cell designs having large active areas and in which the residence time of the reformate stream in the fuel cell is prolonged.

Even in the absence of the reverse water shift reaction, the uniform introduction and distribution of oxygen across the active area of the fuel cell is advantageous. In this regard, the even introduction and distribution of $O_2$ across the active area of the fuel cell promotes the maintenance of a uniform temperature profile across the active area by preventing temperature increases from the oxidation reactions (reactions (1) and (2) above). A uniform temperature profile in turn prevents the localized heating and sintering of the catalyst. Catalyst sintering can reduce the surface area of the catalyst, inhibit the mass transport through the catalyst, and lower the porosity of the catalyst, thereby diminishing the ability of the catalyst to promote the desired electrochemical reactions in the fuel cell. Thus, the uniform introduction and distribution of oxygen into the active area of the fuel cell not only effects the oxidation of carbon monoxide, but also maintains an advantageous uniform temperature profile across the active area.

Accordingly, it is an object of the present invention to provide a method and apparatus for reducing the concentration of carbon monoxide in a hydrogen-containing gas mixture so as to render the mixture suitable for use as the fuel stream for electrochemical fuel cells, and for other applications employing catalysts that would be adversely affected by higher carbon monoxide concentrations.

It is also an object of the invention to provide a method and apparatus for the oxidation of carbon monoxide to carbon dioxide in a reactant stream within an electrochemical fuel cell.

Another object of the invention is to provide an apparatus and a method for the oxidation of carbon monoxide, produced by the reverse water-shift reaction in a hydrogen-containing reformate gas mixture, by introducing oxygen or an oxygen-containing gas mixture at locations along the reaction pathway within a fuel cell.

A further object of the invention is to provide a method and apparatus for the oxidation of carbon monoxide in a hydrogen-containing reformate gas mixture by introducing oxygen or an oxygen-containing gas mixture at various locations along the reaction pathway in the active area of a fuel cell.

A still further object of the invention is to provide a method and apparatus for the uniform introduction and distribution of oxygen or an oxygen-containing gas mixture into the active area of the fuel cell to maintain a uniform temperature profile across the active area.

SUMMARY OF THE INVENTION

The above and other objects are achieved by a method and apparatus for oxidizing carbon monoxide in the reactant stream, particularly the fuel stream, of an electrochemical fuel cell. In a first embodiment of the method, carbon monoxide is oxidized to carbon dioxide, where the carbon monoxide is present in a reactant stream of an electrochemical fuel cell. The fuel cell has a reactant stream inlet and a reactant stream outlet, and the reactant stream comprises hydrogen, carbon dioxide and, optionally, carbon monoxide. The method comprises:

introducing a first oxygen-containing gas stream into the reactant stream through a first port disposed between the reactant stream inlet and the reactant stream outlet;

contacting the reactant stream including the first oxygen-containing gas stream with catalyst present in the fuel cell, such that the catalyst promotes the oxidation of carbon monoxide to carbon dioxide;

introducing a further oxygen-containing gas stream into the reactant stream through at least one secondary port located between the first port and the reactant stream outlet; and further contacting the reactant stream including the further oxygen-containing gas stream with the catalyst present in the fuel cell, such that the catalyst further promotes the oxidation of carbon monoxide to carbon dioxide.

The catalyst is preferably present in the electrochemically active section of the fuel cell, but can also be disposed in portions of the fuel cell other than the electrochemically active area, such as the reactant manifolds or the optional humidification section when integral with the fuel cell stack.

In a second embodiment of the method, carbon monoxide produced by the reverse water-shift reaction is oxidized to carbon dioxide in a reactant stream of an electrochemical fuel cell. The fuel cell has a reactant stream inlet, a reactant stream outlet and a membrane electrode assembly comprising an electrocatalyst. The reactant stream comprises hydrogen, carbon dioxide and, optionally, carbon monoxide. The reverse water-shift reaction converts carbon dioxide and hydrogen to water and carbon monoxide. The method comprises:

introducing a first oxygen-containing gas stream into the reactant stream through a first port disposed between the reactant stream inlet and the reactant stream outlet;

directing the reactant stream including the first oxygen-containing gas stream to at least a portion of the membrane electrode assembly;

introducing a further oxygen-containing stream through at least one secondary port located between the first port and the reactant stream outlet;

directing the reactant stream including the further oxygen-containing gas stream to at least a portion of the membrane electrode assembly.

In preferred embodiments of each method, the at least one secondary port preferably comprises a plurality of secondary ports located between the first port and the reactant stream outlet. The first port and the at least one secondary port are preferably spaced along the path of the reactant stream between the reactant stream inlet and the reactant stream outlet, such that the concentration of oxygen within the reactant stream is maintained substantially constant between the reactant stream inlet and the reactant stream outlet. The ports are most preferably uniformly spaced along the path of the reactant stream between the reactant stream inlet and the reactant stream outlet. Where the reactant stream further comprises oxygen, the oxygen-containing gas stream can be drawn from the reactant stream.

In a first embodiment of the apparatus, the oxidation of carbon monoxide to carbon dioxide is promoted, where the carbon monoxide is present in a fuel stream of an electrochemical fuel cell. The fuel stream comprises hydrogen, carbon dioxide and, optionally, carbon monoxide. The apparatus comprises:

(a) first and second fluid flow field plates, the plates formed of electrically conductive material, the first plate material substantially impermeable to the fuel stream and the second plate material substantially impermeable to an oxygen-containing oxidant stream, the first plate having an inlet for introducing the fuel stream to a major surface thereof and an outlet for discharging the fuel stream from the major surface, the major surface having formed therein means for directing the fuel stream from the fuel stream inlet to the fuel stream outlet, (b) a membrane electrode assembly interposed between the first and second plates, the assembly comprising first and second electrode layers, the first electrode layer disposed adjacent the major surface of the first plate having the channels formed therein, each of the electrode layers formed of porous electrically conductive sheet material and having a catalyst associated therewith, and an ion exchange membrane interposed between the first and second electrode layers, wherein the first plate has formed therein means for introducing an oxygen-containing gas stream into the fuel stream between the fuel stream inlet and the fuel stream outlet.

The means for introducing the oxygen-containing gas stream into the fuel stream comprises a plurality of pores formed within the first plate. Alternatively, the means for introducing the oxygen-containing gas stream into the fuel stream comprises a plurality of milled openings formed in the first plate. The plurality of openings are preferably formed in the first plate such that the openings are disposed substantially adjacent the at least one channel when the first plate is assembled adjacent the first electrode layer. The plurality of openings are most preferably uniformly spaced between the fuel stream inlet and fuel stream outlet, such that the concentration of the oxygen-containing gas within the fuel stream is maintained substantially constant between the fuel stream inlet and the fuel stream outlet. The oxygen-containing gas stream can be drawn from the oxygen-containing oxidant stream. In that case, the oxygen-containing gas stream is preferably drawn from the oxygen-containing oxidant stream through the ion exchange membrane. Where the fuel stream further comprises oxygen, the oxygen-containing gas stream is preferably drawn from the fuel stream.

The means for directing the fuel stream from the fuel stream inlet to the fuel stream outlet comprises at least one continuous channel interconnecting the fuel stream inlet and the fuel stream outlet. The at least one continuous channel comprises either a single continuous channel or a plurality of continuous channels. Alternatively, the means for directing the fuel stream from the fuel stream inlet to the fuel stream outlet comprises at least one inlet channel extending from the fuel stream inlet and at least one outlet channel extending from the fuel stream outlet, such that the at least one inlet channel is discontinuous with respect to the at least one outlet channel. In operation, the fuel stream flows from within the at least one inlet channel to the at least one outlet channel through the interstitial spaces of the adjacent first electrode layer. The at least one outlet channel preferably comprises at least two outlet channels and each of the at least one inlet channels is preferably interposed between adjacent outlet channels, such that the fuel stream inlet and the fuel stream outlet channels are interdigitated.

In a second embodiment of the apparatus, carbon monoxide is oxidized to carbon dioxide, where the carbon monoxide is present in a fuel stream of an electrochemical fuel cell. The fuel stream comprises hydrogen, carbon dioxide and, optionally, carbon monoxide. The apparatus comprises:

(a) first and second separator layers, the separator layers formed of electrically conductive sheet material, the first separator layer sheet material substantially impermeable to the fuel stream and the second separator layer sheet material substantially impermeable to an oxygen-containing oxidant stream;

(b) a membrane electrode assembly interposed between the first and second separator layers, the assembly comprising first and second electrode layers, the electrode layers formed of porous electrically conductive sheet material and having catalyst associated therewith, and an ion exchange membrane interposed between the first and second electrode layers, the first electrode layer comprising a fuel stream inlet, a fuel stream outlet, and means for flowing the fuel stream within the first electrode layer between the fuel stream inlet and the fuel stream outlet, wherein the first separator layer has formed therein means for introducing an oxygen-containing gas stream into the fuel stream between the fuel stream inlet and the fuel stream outlet.

The means for introducing the oxygen-containing gas stream into the fuel stream comprises a plurality of pores formed within the first plate. Alternatively, the means for introducing the oxygen-containing gas stream into the fuel stream comprises a plurality of milled openings formed in the first plate. The plurality of openings are preferably spaced between the fuel stream inlet and the fuel stream outlet, such that the concentration of oxygen within the fuel stream is maintained substantially constant between the fuel stream inlet and the fuel stream outlet. The plurality of openings are most preferably substantially uniformly spaced between the fuel stream inlet and the fuel stream outlet. The oxygen-containing gas stream can be drawn from the oxygen-containing oxidant stream. In that case, the oxygen-containing gas stream is preferably drawn from the oxygen-containing oxidant stream through the ion exchange membrane. Where the fuel stream further comprises oxygen, the oxygen-containing gas stream is preferably drawn from the fuel stream. The flow means preferably comprises the interstitial spaces within the first electrode layer.

The first electrode layer preferably has at least one channel formed in the surface thereof facing away from the membrane, and the surface of the first separator layer facing the first electrode layer is substantially planar, whereby the surface of the first electrode layer and the adjacent surface of the first separator layer cooperate to define a passage for the flow of the fuel stream within the first electrode layer. The plurality of openings are preferably formed in the first separator layer such that the openings are disposed substantially adjacent the passage. The at least one channel preferably interconnects the fuel inlet and the fuel outlet. Alternatively, the at least one channel comprises a first channel extending from the fuel inlet and a second channel extending from the fuel output, the second channel being discontinuous with respect to the first channel, whereby the fuel stream flows from within the first channel to the second channel through the interstitial spaces of the first electrode layer. The at least one outlet channel preferably comprises at least two outlet channels, and each of the at least one inlet channels is preferably interposed between adjacent outlet channels, such that the fuel stream inlet and the fuel stream outlet channels are interdigitated.

BRIEF DESCRIPTION OF THE DRAWINGS

FIG. 2 is an exploded side view of a fuel cell including a membrane electrode assembly interposed between two fluid flow field plates having reactant flow channels formed in the major surfaces of the plates facing the electrodes.

FIG. 3 is an exploded side view of a fuel cell including a membrane electrode assembly having integral reactant flow channels interposed between two separator layers.

DETAILED DESCRIPTION OF THE PREFERRED EMBODIMENTS

Figure 1:
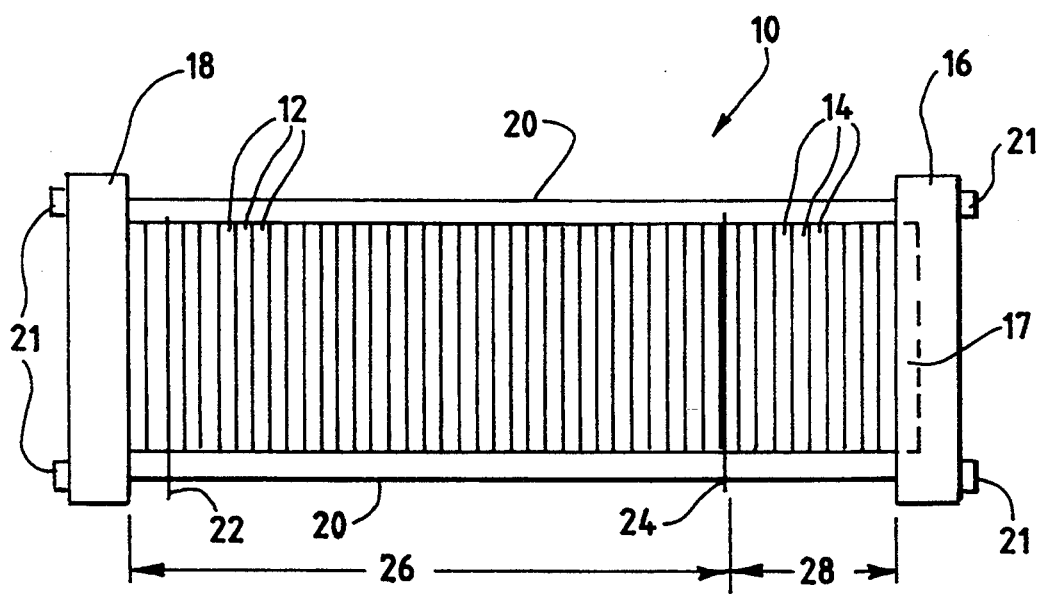
FIG. 1 is a side elevation view of a fuel cell stack showing the electrochemically active and humidification sections.

Turning first to FIG. 1, a fuel cell stack assembly 10 includes an electrochemically active section 26 and optionally includes a humidification section 28. Stack assembly 10 is a modular plate and frame design, and includes a compression end plate 16 and a fluid end plate 18. An optional pneumatic piston 17, positioned within compression end plate 16, applies uniform pressure to the assembly to promote sealing. Bus plates 22 and 24 located on opposite ends of active section 26 provide the negative and positive contacts, respectively, for the electrical path directing current generated by the assembly to an external electrical load (not shown). Tie rods 20 extend between end plates 16 and 18 to retain and secure stack assembly 10 in its assembled state with fastening nuts 21.

Active section 26 includes, in addition to bus plates 22 and 24, a plurality of fuel cell repeating units 12. Each repeating unit 12 consists of a membrane electrode assembly, an anode fluid flow field plate, a cathode fluid flow field plate (or alternatively anode and cathode separator layers if the anode and cathode reactant flow channels are formed in the surfaces of the electrode material) and optionally a cooling jacket, as described in more detail below. In the assembly illustrated in FIG. 1, the repeating units 12 are electrically coupled in series by virtue of the contact between the electrically conductive layers which form the flow field plates (or the separator layers) and the cooling jackets.

Optional humidification section 28 includes a plurality of humidification assemblies 14, each assembly 14 consisting of fuel or oxidant reactant flow field plate, a water flow field plate, and a water transport membrane interposed between the reactant flow field plate and the water flow field plate. When present, humidification section 28 imparts water to the fuel and oxidant streams fed to active section 26, thereby preventing the membranes within the active section from drying out.

FIG. 2 illustrates a fuel cell 30, which includes a membrane electrode assembly 32 interposed between rigid flow field plates 34 and 36, preferably formed of graphite or a graphite composite material. Membrane electrode assembly 32 consists of an ion exchange membrane 42 interposed between two electrodes, namely, anode 44 and cathode 46. Anode 44 and cathode 46 are typically formed of porous electrically conductive sheet material, preferably carbon fiber paper, and have planar major surfaces. Electrodes 44 and 46 have a thin layer of catalyst material disposed on their major surfaces at the interface with membrane 42 to render them electrochemically active.

As shown in FIG. 2, anode flow field plate 34 has at least one open faced channel 34a engraved, milled or molded in its major surface facing membrane 42. Similarly, cathode flow field plate 36 has at least one open faced channel 36a engraved, milled or molded in its major surface facing membrane 42. When assembled against the cooperating surfaces of electrodes 44 and 46, channels 34a and 36a form the reactant flow field passages for the fuel and oxidant streams, respectively.

Turning now to FIG. 3, a fuel cell 50 employs a membrane electrode assembly 52 having integral reactant fluid flow channels. Fuel cell 50 includes membrane electrode assembly 52 interposed between lightweight separator layers 54 and 56, which are substantially impermeable to the flow of reactant fluid therethrough. Membrane electrode assembly 52 consists of an ion exchange membrane 62 interposed between two electrodes, namely, anode 64 and cathode 66. Anode 64 and cathode 66 are formed of porous electrically conductive sheet material, preferably carbon fiber paper. Electrodes 64 and 66 have a thin layer of catalyst material disposed on their major surfaces at the interface with membrane 62 to render them electrochemically active.

As shown in FIG. 3, anode 64 has at least one open faced channel 64a formed in its surface facing away from membrane 62. Similarly, cathode 66 has at least one open faced channel 66a formed in its surface facing away from membrane 62. When assembled against the cooperating surfaces of separator layers 54 and 56, channels 64a and 66a form the reactant flow field passages for the fuel and oxidant streams, respectively.

Figure 4:
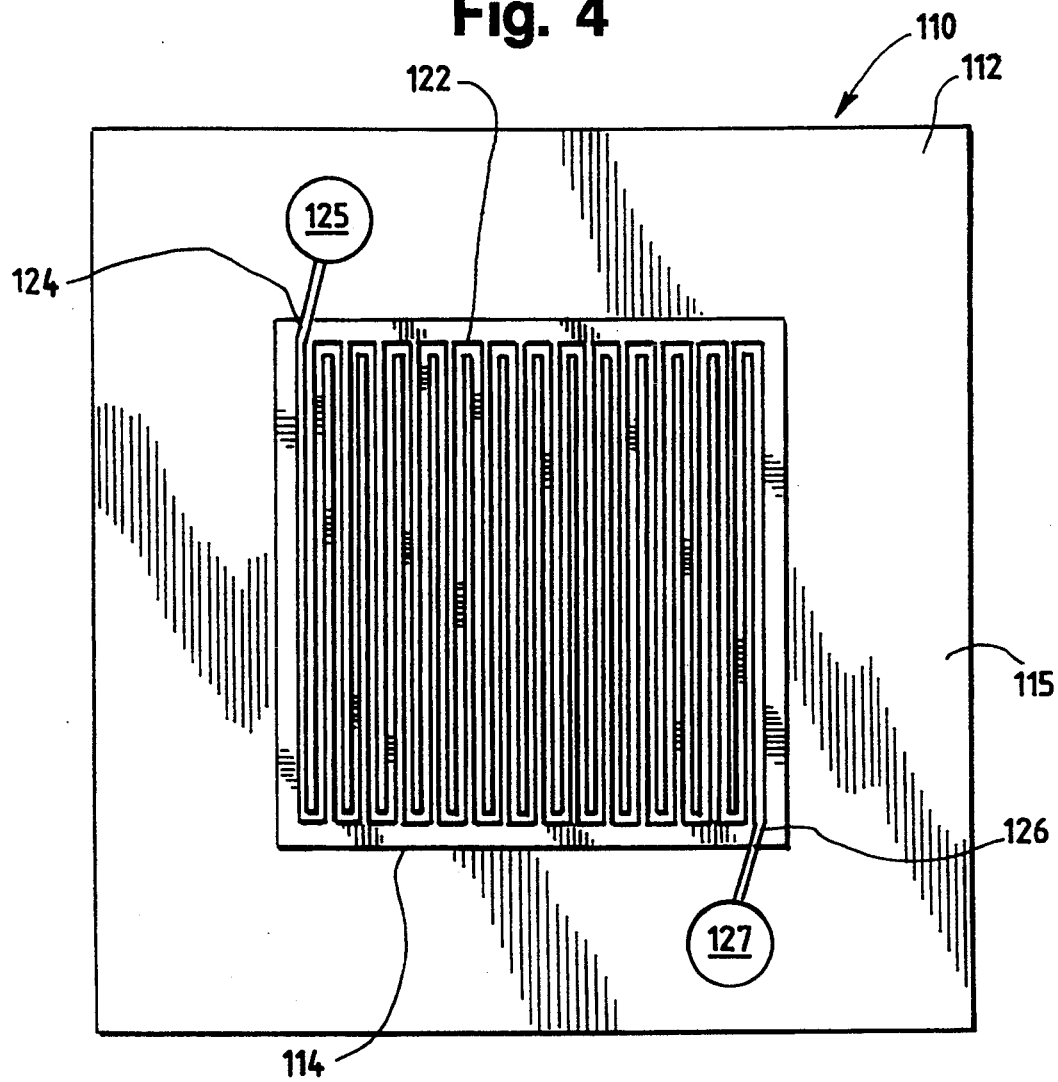
FIG. 4 is a top plan view of a fluid flow field plate having a single continuous open-faced channel that traverses the central area of the plate in a plurality of passes between a fluid inlet directly connected to a fluid supply opening and a fluid outlet directly connected to a fluid exhaust opening, as described in Watkins U.S. Pat. No. 4,988,583.

A prior art fluid flow field plate 110 having a single continuous reactant flow channel, described in Watkins U.S. Pat. No. 4,988,583, is shown in FIG. 4. Major plate surface 115 has formed therein, typically by numerically controlled machining, stamping or molding, a single continuous fluid flow channel 122. Channel 122 has a fluid inlet 124 at one end and a fluid outlet 126 at the other end. Fluid inlet 124 is directly connected to a fluid supply opening or manifold 125 formed in plate 112. Fluid outlet 126 is directly connected to a fluid exhaust opening or manifold 127 formed in plate 112. Fluid opening 126 is connected to a source of fuel (not shown) in the case of the anode flow field plate or a source of oxidant (not shown) for the cathode flow field plate. Channel 122 traverses in a plurality of passes a major central area of plate 112, which in turn generally corresponds to the electrocatalytically active region of the anode or cathode to which it is adjacent when assembled sealant or gasketing material 114 fluidly isolates the major central area of plate 112.

Figure 5:
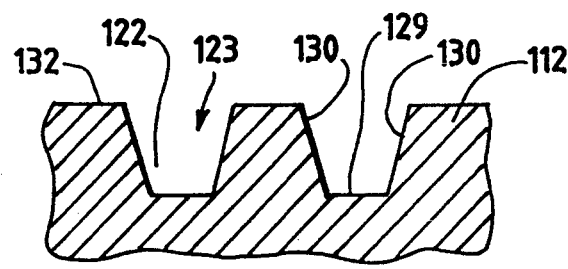
FIG. 5 is an enlarged sectional view of the channels formed in the surface of the fluid flow field plate illustrated in FIG. 4.

FIG. 5 shows a cross sectional view of the channel 122 of fluid flow field plate 110 in FIG. 4. Channel 122 has a configuration that is typical of machined open face channels, namely, it is defined by a substantially flat base 129 and opposing side walls 130 which diverge outwardly toward the open face 123 of channel 122. The illustrated cross sectional configuration of channel 122 is designed to minimize tool wear. Channel 122 is preferably of uniform depth throughout its length. A series of lands 132 is defined between the passes of channel 122. When assembled, the lands 132 between channels 122 are in contact with the electrode surface adjacent thereto, so that each flow field plate also functions as a current collector.

Figure 6:
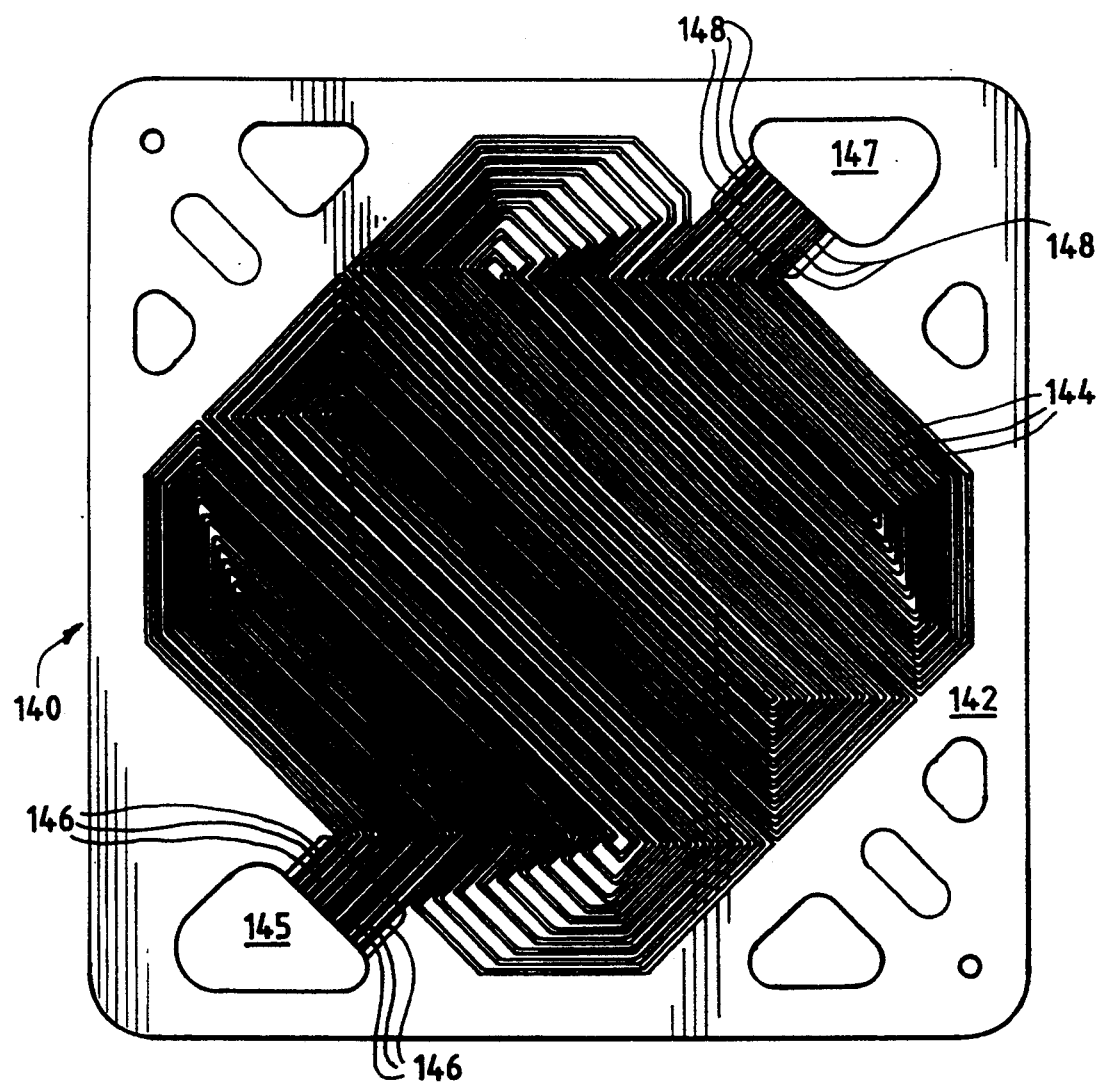
FIG. 6 is a top plan view of a fluid flow field plate having multiple continuous open-faced channels, each of which traverses the central area of the plate in a plurality of passes between a fluid inlet directly connected to a fluid supply opening and a fluid outlet directly connected to a fluid exhaust opening, as described in Watkins U.S. Pat. No. 5,108,849.

A prior art fluid flow field plate 140 having multiple continuous reactant flow channels, described in Watkins U.S. Pat. No. 5,108,849, is shown in FIG. 6. Major surface 142 has formed therein a plurality of flow field channels, several of which are designated by the numeral 144. Channels 144 each define a generally serpentine path between fluid supply opening or manifold 145 and fluid exhaust opening or manifold 147. Each channel 144 has an inlet end 146 and an outlet end 148 directly connected to the respective fluid supply openings or ports 145 and fluid exhaust openings or ports 147. Plate 140, which contains 10 individual serpentine channels 144, has been found to operate effectively in a fuel cell adjacent the cathode, and is sometimes referred to as a 10-pass cathode flow field plate. A greater or lesser number of channels 144 could be incorporated in the plate, such as, for example, in the case of a 2-pass flow field plate which has been found to operate effectively adjacent the anode, and is sometimes referred to as a 2-pass anode flow field plate.

Figure 7:
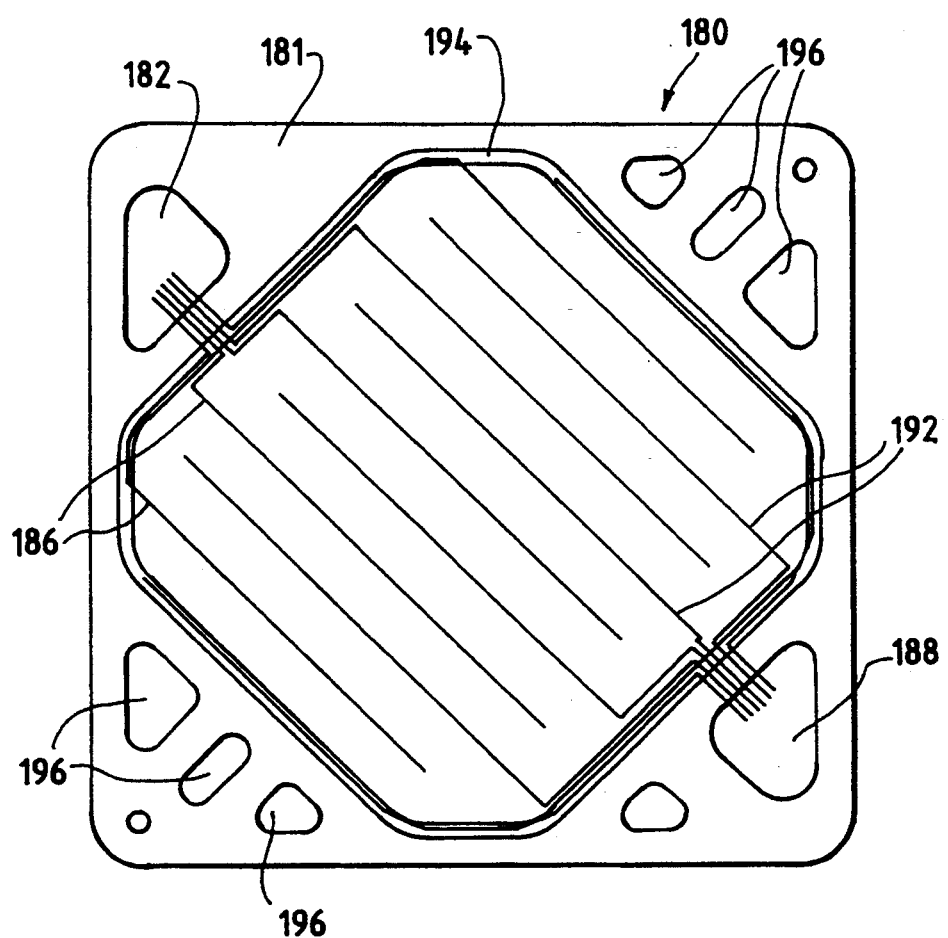
FIG. 7 is a top plan view of a fluid flow field plate having 11 discontinuous, interdigitated fluid flow channels, 5 channels of which are inlet channels extending from a reactant inlet opening and 6 channels of which are outlet channels extending from a reactant outlet opening, each of the inlet channels being disposed between a pair of outlet channels.

FIG. 7 shows a fluid flow field plate 180 having 11 discontinuous, interdigitated fluid flow channels. Plate 180 has a fluid inlet 182 formed in the surface 181 thereof. Inlet channels 186 extend from inlet 182 toward the central region of plate, which is adjacent to the electrocatalytically active region of the electrode with which plate 180 is associated. Plate 180 also has a fluid outlet 188 formed in the surface 181 of plate 180. Outlet channels 192 extend from outlet 188 toward the central region of the plate. As illustrated in FIG. 7, inlet channels 186 and outlet channels 192 are interdigitated, so that a pressurized fluid stream entering through opening 182 will be directed to inlet channels 186. At that point, the fluid stream will be forced through the interstices of the adjacent porous electrode material (not shown) on either side of each inlet channel 186 to one of the nearby outlet channels 192. From there, the fluid stream will flow through outlet 188, where it is discharged from the flow field plate 180.

As shown in FIG. 7, plate 180 contains 11 discontinuous fluid flow channels, 5 channels of which are inlet channels extending from the inlet and 6 channels of which are outlet channels extending from the outlet. Each of the inlet channels is preferably disposed between a pair of outlet channels so that the fluid stream from the inlet channels is uniformly directed from either side of the inlet channels to one of the neighboring outlet channels.

FIG. 7 also illustrates the location of a sealant or gasketing material 194 which contacts surface 181 and circumscribes the central area of plate 180. Sealant or gasketing material 194 isolates and defines within it the electrocatalytically active region of the fuel cell adjacent plate 180. Plate 180 also has other openings 196 formed therein, which serve as the manifolds for other reactant and coolant streams within the fuel cell.

Figure 8:
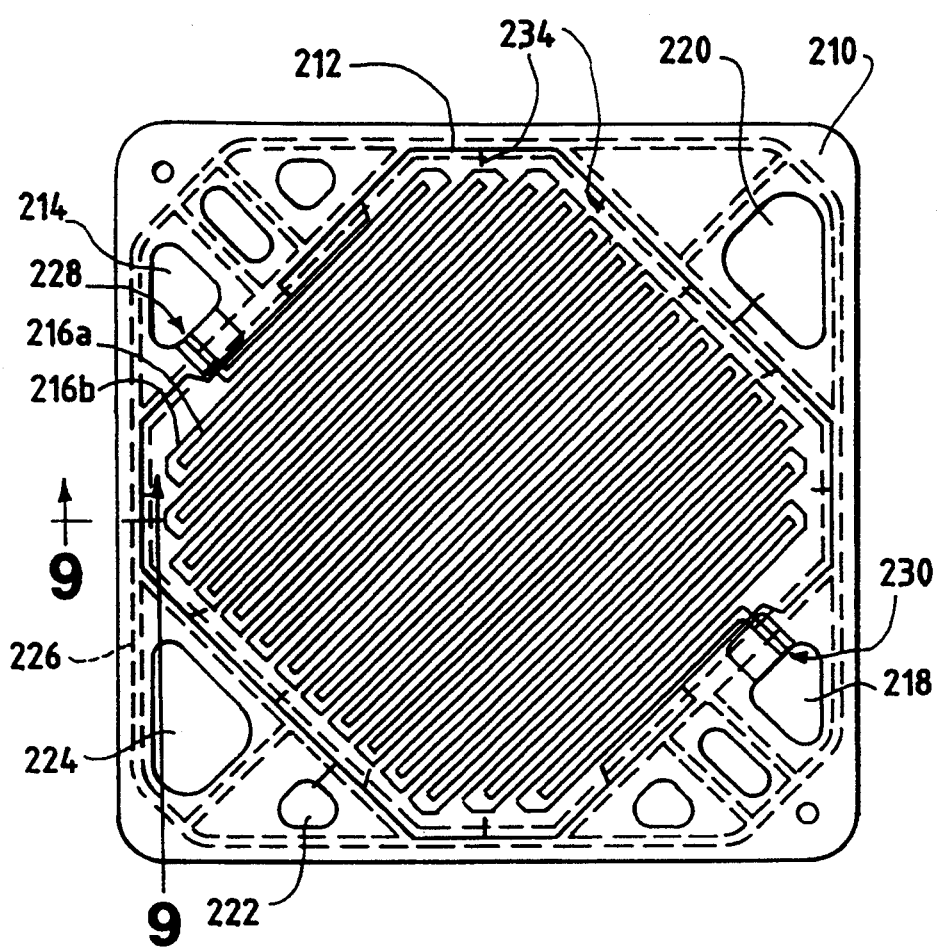
FIG. 8 is a top plan view of a fluid flow field plate having an oxidant bleed channel formed therein around the perimeter of the electrochemically active area and which has uniformly spaced branches extending therefrom for introducing an oxygen-containing gas stream from the oxidant exhaust manifold to the fuel stream flowing through a serpentine flow field.

FIG. 8 illustrates a fluid flow field plate 210 having an oxidant bleed channel 212 formed therein for introducing an oxygen-containing gas stream from the humidified oxidant exhaust manifold 220, humidified oxidant manifold 224 and the dry oxidant supply manifold 222 to the fuel stream prior to feeding the fuel stream to the active section of the fuel cell. The fuel stream is introduced to the surface of plate 210 from the humidified fuel manifold 214 through a fuel inlet 228. The fuel stream then passes through a two-pass serpentine flow field formed by two channels 216a and 216b formed on the major surface of plate 210. The fuel stream flowing through channels 216a and 216b receives oxygen-containing gas from the branch channels 234 extending from the oxidant bleed channel 212. As shown in FIG. 8, the branch channels 234 are substantially uniformly spaced around the perimeter of the electrochemically active area of the plate 210, which is traversed by the serpentine channels 216a and 216b. The unreacted fuel stream components exit channels 216a and 216b via an outlet 230 to a fuel exhaust manifold 218. The area 226 between the broken lines on the surface of plate 210 represents the location of sealant or gasketing material which isolates the electrochemically active area from the manifolds, isolates the manifolds from each other, and isolates the electrochemically active area and the manifolds from the external environment.

Figure 9:
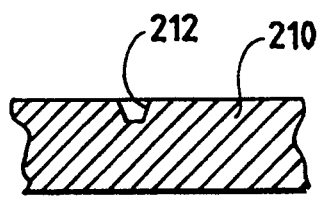
FIG. 9 is a side sectional view taken in the direction of arrows A—A in FIG. 8.

FIG. 9 shows a cross-section of plate 210 taken in the direction of arrows A—A in FIG. 8, and illustrates in particular the configuration of oxidant bleed channel 212 formed in plate 210.

Figure 10:
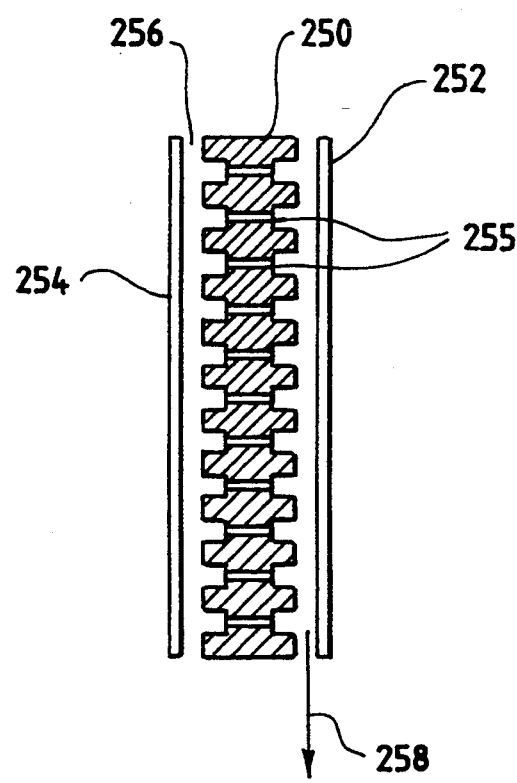
FIG. 10 is a side sectional view of a fluid flow plate, interposed between a gas impermeable separator layer and a membrane electrode assembly, in which the plate has a plurality of openings or ports formed therein for introducing an oxygen-containing reformate gas stream to the opposite fuel flow field side of the plate.

FIG. 10 shows a fluid flow plate 250 interposed between a gas impermeable separator layer 254 and a membrane electrode assembly 252. Plate 250 has a plurality of milled openings or ports 256 formed therein for introducing an oxygen-containing reformate fuel gas stream 256 to the opposite fuel flow field side of the plate. As shown in FIG. 10, the unreacted components of the fuel gas stream exit the fuel flow field as fuel exhaust gas stream 258.

Alternatively, the fluid flow plate 250 of FIG. 10 can be formed as a porous plate. In the porous plate embodiment, the oxygen-containing gas stream is introduced into the fuel stream through a plurality of pores formed within the plate 250. The pores are the interstitial spaces or passages at the interior of plate 250 which are not occupied by the solid, electrically conductive sheet material from which plate 250 is formed. The pores of the porous plate embodiment perform the function of the ports 255 in FIG. 10.

Figure 11:
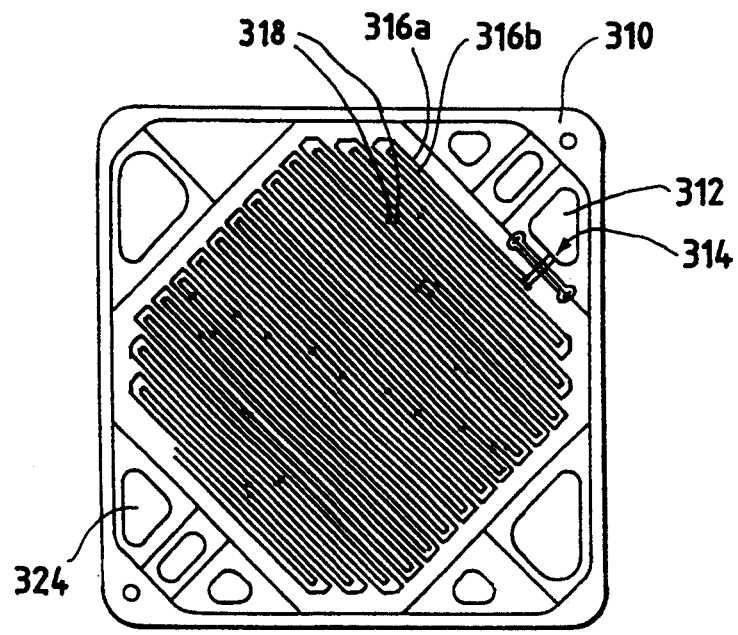
FIG. 11 is a top plan view of the fuel manifold side of a fluid flow field plate having two serpentine channels, each of which has 15 uniformly spaced ports formed therein for introducing oxygen-containing reformate gas to the opposite fuel flow field side of the plate.

FIG. 11 shows the fuel manifold side of a fluid flow field plate 310. Plate 310 has two serpentine channels 316a and 316b formed on the surface of the fuel manifold side. Oxygen-containing reformate fuel gas enters the channels 316a and 316b via an inlet 314 from reformate fuel gas manifold 312. Each of channels 316a and 316b has 15 uniformly spaced openings or ports 318 formed therein for introducing the oxygen-containing reformate gas to the opposite fuel flow field side of plate 310 (shown in FIG. 12). FIG. 11 also illustrates the location of fuel exhaust manifold 324 into which the unreacted fuel stream components exit from the opposite fuel flow field side of plate 310.

Figure 12:
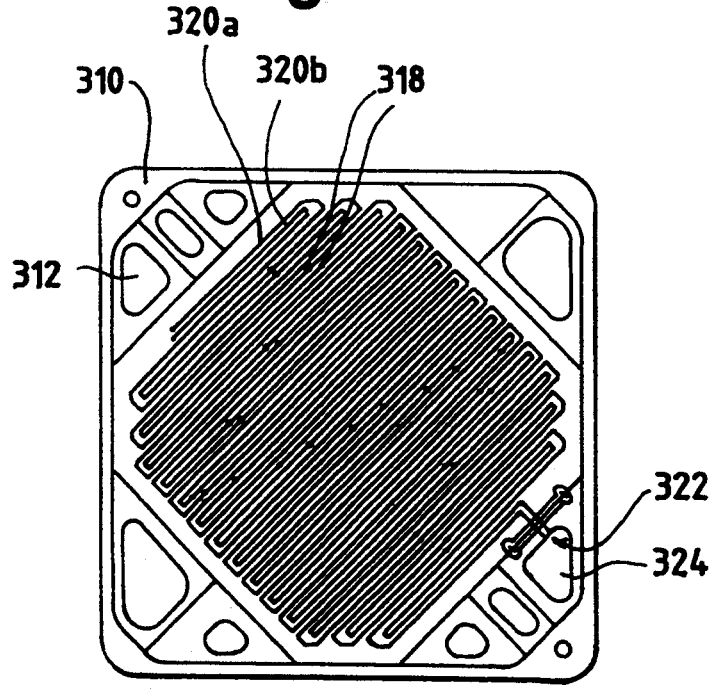
FIG. 12 is a top plan view of the fuel flow field side of the fluid flow field plate illustrated in FIG. 11, having two serpentine channels, each of which has 15 uniformly spaced ports formed therein for receiving oxygen-containing reformate gas introduced from the opposite fuel manifold side of the plate.

FIG. 12 shows the fuel flow field side of plate 310 illustrated in FIG. 11. Plate 310 has two serpentine channels 320a and 320b formed on the fuel flow field side. Each of channels 320a and 320b has 15 uniformly spaced openings or ports 318 formed therein for receiving oxygen-containing reformate fuel gas introduced from the opposite fuel manifold side of plate 310. The unreacted fuel stream components exit channels 320a and 320b via an outlet 322 to a fuel exhaust manifold 324.

Figure 13:
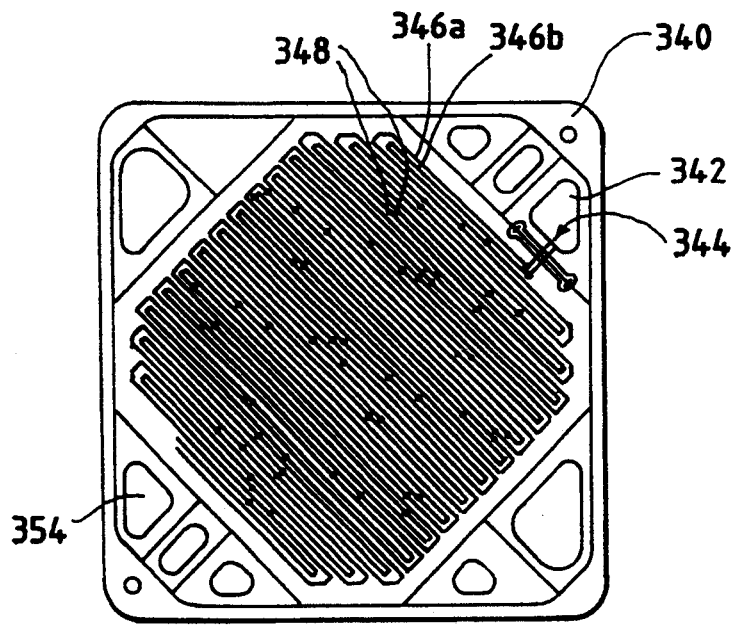
FIG. 13 is a top plan view of the fuel manifold side of a fluid flow field plate having two serpentine channels, each of which has 30 uniformly spaced ports formed therein for introducing oxygen-containing reformate gas to opposite fuel flow field side of the plate.

FIG. 13 shows the fuel manifold side of a fluid flow field plate 340. Plate 340 has two serpentine channels 346a and 346b formed on the surface of the fuel manifold side. Oxygen-containing reformate fuel gas enters the channels 346a and 346b via an inlet 344 from reformate fuel gas manifold 342. Each of channels 346a and 346b has 30 uniformly spaced openings or ports 348 formed therein for introducing the oxygen-containing reformate gas to the opposite fuel flow field side of plate 340 (shown in FIG. 14). FIG. 13 also illustrates the location of fuel exhaust manifold 354 into which the unreacted fuel stream components exit from the opposite fuel flow field side of plate 340.

Figure 14:
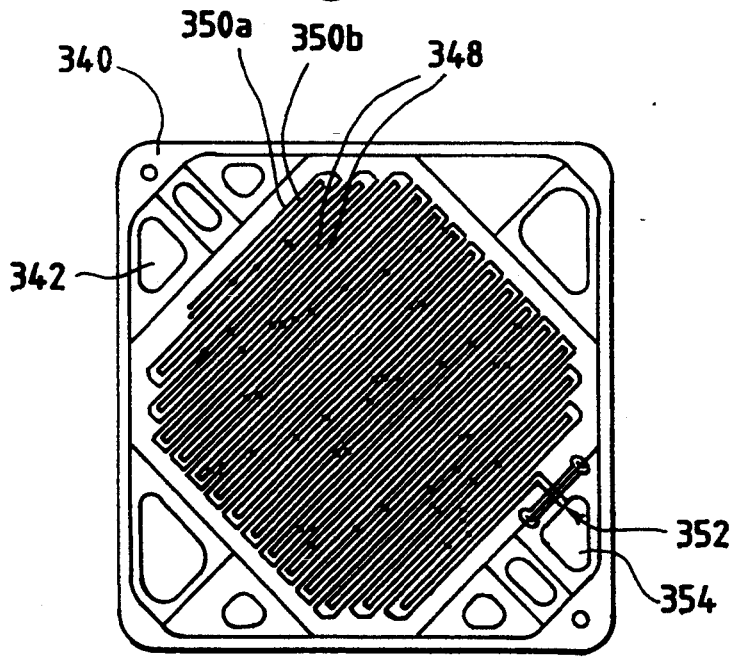
FIG. 14 is a top plan view of the fuel flow field side of the fluid flow field plate illustrated in FIG. 13, having two serpentine channels, each of which has 30 uniformly spaced ports formed therein for receiving oxygen-containing reformate gas introduced from the opposite fuel manifold side of the plate.

FIG. 14 shows the fuel flow field side of plate 340 illustrated in FIG. 13. Plate 340 has two serpentine channels 350a and 350b formed on the fuel flow field side. Each of channels 350a and 350b has 30 uniformly spaced openings or ports 348 formed therein for receiving oxygen-containing reformate fuel gas introduced from the opposite fuel manifold side of plate 340. The unreacted fuel stream components exit channels 350a and 350b via an outlet 352 to a fuel exhaust manifold 354.

Figure 15:
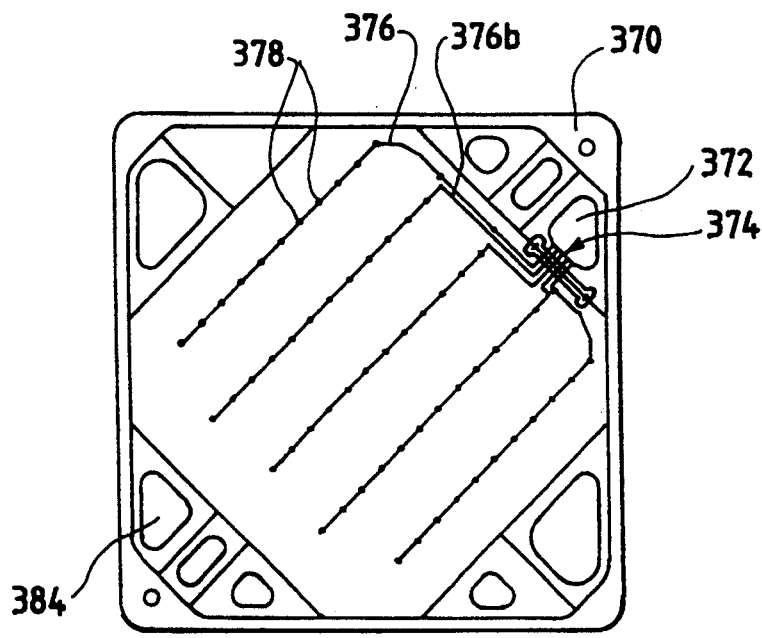
FIG. 15 is a top plan view of the fuel manifold side of a fluid flow field plate having 5 discontinuous channels, each of which has a plurality of uniformly spaced ports formed therein for introducing oxygen-containing reformate gas to the opposite fuel flow field side of the plate.

FIG. 15 shows the fuel manifold side of a fluid flow field plate 370. Plate 370 has 5 discontinuous channels, two of which are designated in FIG. 15 as channels 376a and 376b, formed on the surface of the fuel manifold side. Oxygen-containing reformate fuel gas enters the channels via an inlet 374 from reformate fuel gas manifold 372. Each channel has a plurality of uniformly spaced openings or ports 378 formed therein for introducing oxygen-containing reformate gas to the opposite fuel flow field side of plate 370 (shown in FIG. 16). FIG. 15 also illustrates the location of fuel exhaust manifold 384 into which the unreacted fuel stream components exit from the opposite fuel flow field side of plate 370.

Figure 16:
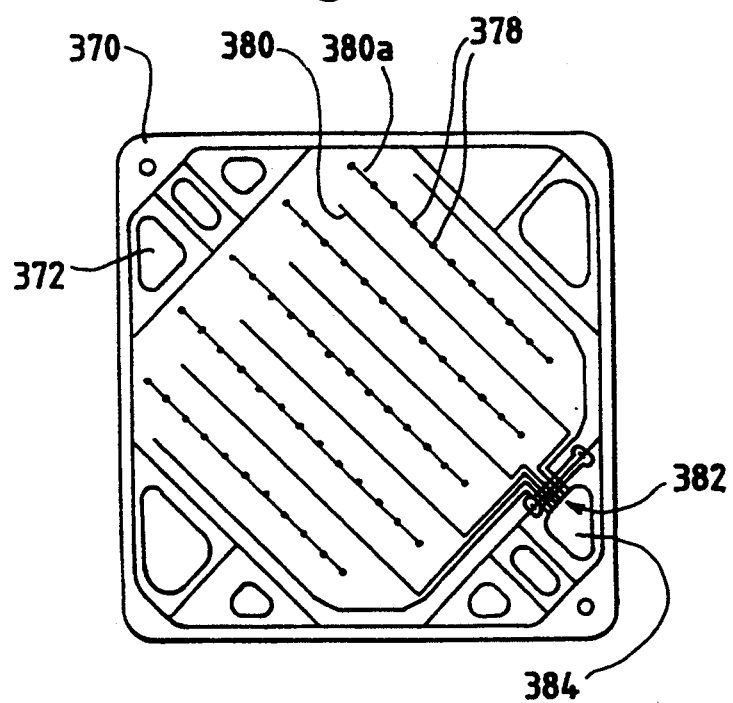
FIG. 16 is a top plan view of the fuel flow field side of the fluid flow field plate illustrated in FIG. 15, having 11 discontinuous, interdigitated channels, 5 of which have a plurality of uniformly spaced ports formed therein for receiving oxygen-containing reformate gas introduced from the opposite fuel manifold side of the plate.

FIG. 16 shows the fuel flow field side of plate 370 illustrated in FIG. 15. Plate 370 has 11 discontinuous, interdigitated channels. A first group of five channels, one of which is designated in FIG. 16 as channel 380a, has a plurality of uniformly spaced openings or ports 378 formed therein for receiving oxygen-containing reformate gas introduced from the opposite fuel manifold side of plate 370. A second group of 6 channels, one of which is designated in FIG. 16 as channel 380b, does not have openings or ports formed therein. Each of the second group of channels receives the fuel gas stream which flows through the porous electrode material from the first group of channels having openings or ports 378 formed therein. The unreacted fuel stream components exit the second group of channels via an outlet 382 to a fuel exhaust manifold 384.

Figure 17:
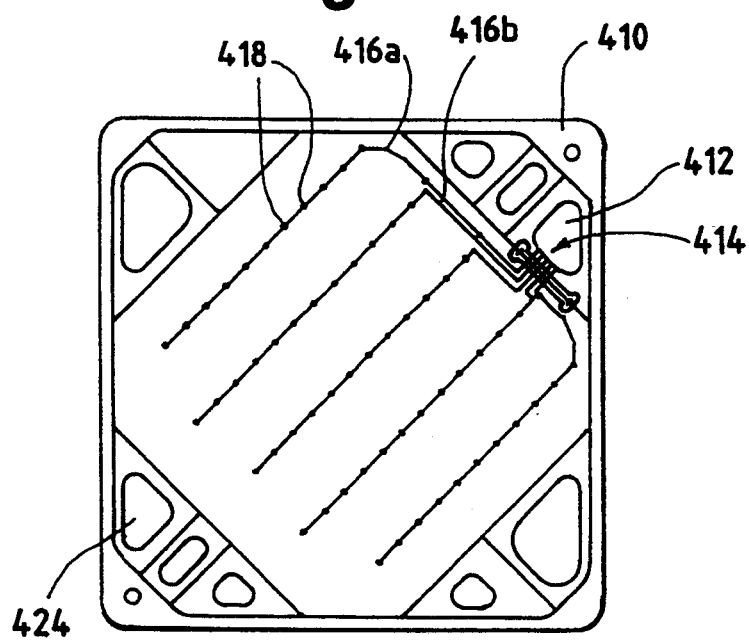
FIG. 17 is a top plan view of the fuel manifold side of a fluid flow field plate having 5 discontinuous channels, each of which has a plurality of uniformly spaced ports formed therein for introducing oxygen-containing reformate gas to the opposite fuel flow field side of the plate.

FIG. 17 shows the fuel manifold side of a fluid flow field plate 410. Plate 410 has 5 discontinuous channels, two of which are designated in FIG. 17 as channels 416a and 416b, formed on the surface of the fuel manifold side. Oxygen-containing reformate fuel gas enters the channels via an inlet 414 from reformate fuel gas manifold 412. Each channel has a plurality of uniformly spaced openings or ports 418 formed therein for introducing oxygen-containing reformate gas to the opposite fuel flow field side of plate 410 (shown in FIG. 18). FIG. 17 also illustrates the location of fuel exhaust manifold 424 into which the unreacted fuel stream components exit from the opposite fuel flow field side of plate 410.

Figure 18:
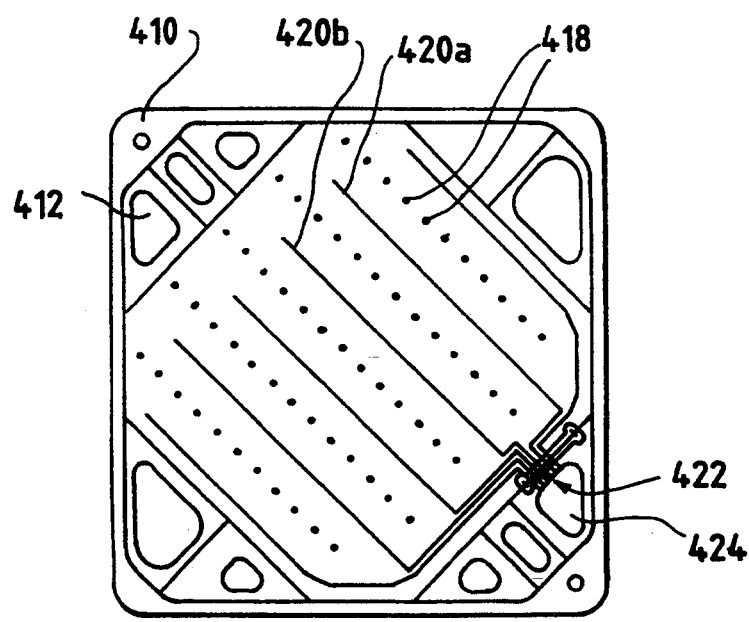
FIG. 18 is a top plan view of the fuel flow field side of the fluid flow field plate illustrated in FIG. 17, having 5 rows of uniformly spaced ports formed therein for receiving oxygen-containing reformate gas introduced from the opposite fuel manifold side of the plate and 6 discontinuous channels disposed in interdigitated relation to the rows of ports.

FIG. 18 shows the fuel flow field side of plate 410 illustrated in FIG. 17. Plate 410 has five rows of uniformly spaced openings or ports 418 formed therein for receiving oxygen-containing reformate gas introduced from the opposite fuel manifold side of plate 410. Plate 410 also has 6 discontinuous, interdigitated channels formed therein, two of which are designated in FIG. 18 as channels 420a and 420b, which do not have openings or ports formed therein. Each channel receives the fuel gas stream which flows from the openings or ports 418 through the porous electrode material. The unreacted fuel stream components exit the channels via an outlet 422 to a fuel exhaust manifold 424.

Figure 19:
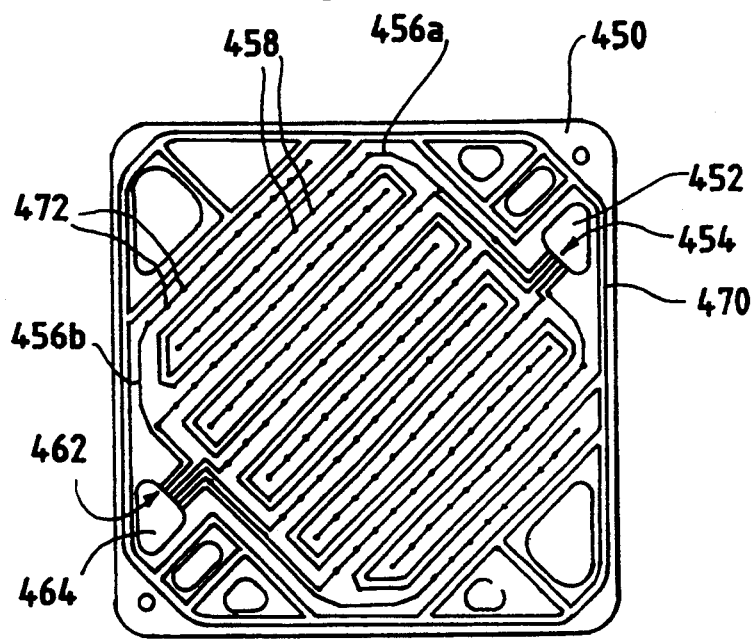
FIG. 19 is a top plan view of the fuel manifold side of a fluid flow field plate having 5 discontinuous inlet channels, each of which has a plurality of uniformly spaced inlet ports formed therein for introducing oxygen-containing reformate gas to the opposite fuel flow field side of the plate, and 6 discontinuous outlet channels, each of which has a plurality of uniformly spaced outlet ports formed therein for receiving oxygen-containing reformate gas from the opposite fuel flow field side of the plate, the inlet and outlet channels being disposed in interdigitated relation and separated by a gasket seal.

FIG. 19 shows the fuel manifold side of a fluid flow field plate 450. Plate 450 has 5 discontinuous inlet channels, one of which is designated in FIG. 19 as channel 456a. Oxygen-containing reformate fuel gas enters the inlet channels via an inlet 454 from reformate fuel gas manifold 452. Each inlet channel has a plurality of substantially uniformly spaced inlet openings or ports 458 formed therein for introducing oxygen-containing reformate gas to the opposite fuel flow field side of plate 450 (shown in FIG. 20). Plate 450 also has 6 discontinuous outlet channels, one of which is designated in FIG. 19 as channel 456b. Each outlet channel has a plurality of substantially uniformly spaced outlet openings or ports 472 formed therein for receiving the unreacted fuel stream components from the opposite fuel flow field side of plate 450 (shown in FIG. 20). The unreacted fuel stream components exit the outlet channels via an outlet 462 to a fuel exhaust manifold 464. As shown in FIG. 19, the inlet and outlet channels are disposed in interdigitated relation and are separated by a gasket seal 470. FIG. 19 also illustrates the location of fuel exhaust manifold 464 into which the unreacted fuel stream components exit from the opposite fuel flow field side of plate 450. The presence of channels 460a and 460b is optional; the reactant (fuel) stream could flow through the interstitial spaces in the adjacent porous electrode material, between the inlet openings 458 and the outlet openings 472.

Figure 20:
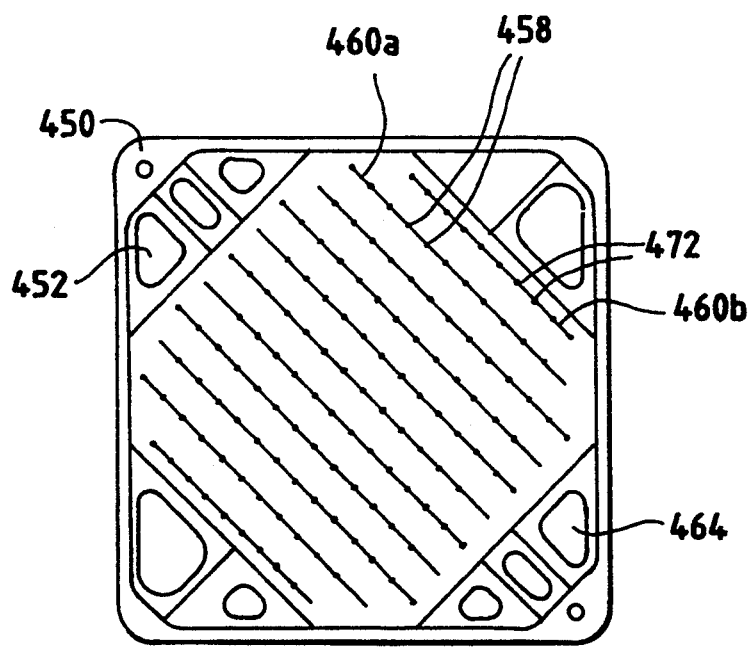
FIG. 20 is a top plan view of the fuel flow field side of the fluid flow field plate illustrated in FIG. 19, having 5 inlet channels formed therein, each of which has a plurality of uniformly spaced inlet ports formed therein for receiving oxygen-containing reformate gas introduced from the opposite fuel manifold side of the plate, and 6 outlet channels formed therein, each of which has a plurality of uniformly spaced outlet ports formed therein for returning reformate gas to the opposite fuel manifold side of the plate, the inlet and outlet channels being disposed in alternating relation.

FIG. 20 shows the fuel flow field side of the plate 450 illustrated in FIG. 19. The flow field side of plate 450 has 5 inlet channels, one channel of which is designated in FIG. 20 as channel 460a. Each inlet channel has a plurality of substantially uniformly spaced inlet openings or ports 458 formed therein for receiving oxygen-containing reformate gas introduced from the opposite fuel manifold side of plate 450. The flow field side of plate 450 also has 6 outlet channels formed therein, one of which is designated in FIG. 20 as channel 460b. Each outlet channel has a plurality of substantially uniformly spaced outlet openings or ports 472 formed therein for returning reformate gas to the opposite fuel manifold side of plate 450.

Figure 21:
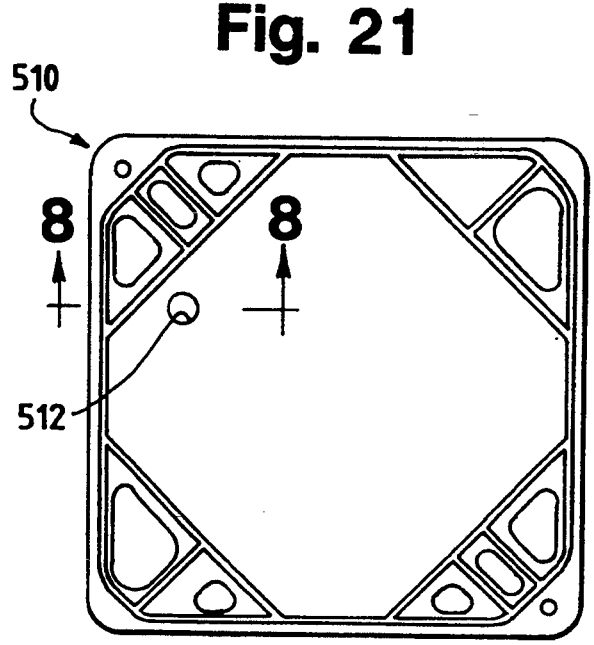
FIG. 21 is a top plan view of a membrane electrode assembly having a cylindrical opening formed therein for introducing an oxygen-containing gas stream from the cathode side of the fuel cell into the reactant fuel stream on the anode side of the fuel cell through openings formed in the electrodes and the membrane.
Figure 22:
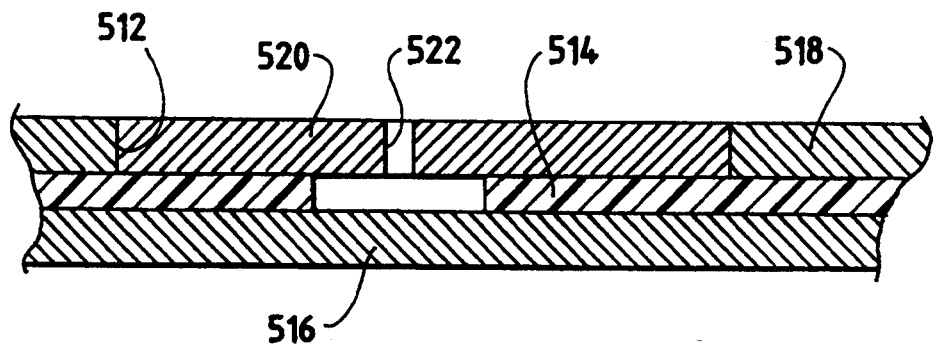
FIG. 22 is a side sectional view taken in the direction of arrows B—B in FIG. 21.

FIG. 21 illustrates a membrane electrode assembly 510 having a cylindrical opening 512 formed therein. As shown in more detail in FIG. 22, membrane electrode assembly 510 consists of a membrane electrolyte 514 interposed between two sheets of porous electrode material, one sheet of which forms the anode 516 and the other of which forms the cathode 518. As further shown in FIG. 22, a rigid disc 520, preferably formed of metal and having an annular orifice 522 formed at the center thereof, is disposed in the portion of the opening 512 formed by cathode 518. In operation, an oxygen-containing gas stream from the cathode side of the fuel cell is introduced into the reactant fuel stream on the anode side through orifice 522.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for oxidizing carbon monoxide to carbon dioxide, said carbon monoxide being present in a reactant stream of an electrochemical fuel cell, said method comprising:

providing an electrochemical fuel cell, said fuel cell comprising a reactant stream inlet, a reactant stream outlet, at least one passageway directing a reactant stream between said reactant stream inlet and said reactant stream outlet, and an electrochemically active section through which at least a portion of said at least one passageway extends, said reactant stream comprising carbon monoxide, carbon dioxide, and hydrogen;

introducing a first oxygen-containing gas stream into said reactant stream through a first port disposed between said reactant stream inlet and said reactant stream outlet;

contacting said reactant stream including said first oxygen-containing gas stream with catalyst present in said at least one passageway of said fuel cell, said catalyst promoting oxidation of carbon monoxide to carbon dioxide;

introducing a second oxygen-containing gas stream into said reactant stream through at least one secondary port located between said first port and said reactant stream outlet; and further contacting said reactant stream and said second oxygen-containing gas stream with said catalyst for further promoting the oxidation of carbon monoxide to carbon dioxide.

2. The method of claim 1 wherein said at least one secondary port comprises a plurality of secondary ports located between said first port and said reactant stream outlet.

3. The method of claim 1 wherein said first port and said at least one secondary port are located between said reactant inlet and said reactant outlet such that oxygen concentration within said reactant stream is maintained substantially constant between said first port and said reactant stream outlet.

4. The method of claim 3 wherein said first port and said at least one secondary port are substantially uniformly spaced along the path of said reactant stream between said reactant stream inlet and said reactant stream outlet.

5. The method of claim 1 wherein said reactant stream further comprises oxygen and wherein said second oxygen-containing gas stream is drawn from said reactant stream.

6. A method for oxidizing carbon monoxide produced by the reverse water-shift reaction to carbon dioxide in a reactant stream of an electrochemical fuel cell, said reverse water-shift reaction converting carbon dioxide and hydrogen to water and carbon monoxide, the method comprising:

providing an electrochemical fuel cell having a reactant stream comprising hydrogen and carbon dioxide, said electrochemical fuel cell comprising a reactant stream inlet, a reactant stream outlet and a membrane electrode assembly comprising an electrocatalyst;

introducing a first oxygen-containing gas stream into said reactant stream through a first port disposed between said reactant stream inlet and said reactant stream outlet;

directing said reactant stream and said first oxygen-containing gas stream to at least a portion of said membrane electrode assembly to promote oxidation of carbon monoxide present in said reaction stream to carbon dioxide;

introducing a second oxygen-containing gas stream into said reactant stream through at least one secondary port located between said first port and said reactant stream outlet;

directing said reactant stream and said second oxygen-containing gas stream to at least a portion of said membrane electrode assembly further promote oxidation of carbon monoxide present in said reactant stream to carbon dioxide.

7. The method of claim 6 wherein said at least one secondary port comprises a plurality of secondary ports located between said first port and said reactant stream outlet.

8. The method of claim 6 wherein said first port and said at least one secondary port are located between said reactant inlet and said reactant outlet each that oxygen concentration within said reactant stream is maintained substantially constant between said first port and said reactant stream outlet.

9. The method of claim 8 wherein said first port and said plurality of secondary ports are substantially uniformly spaced along the path of said reactant stream between said reactant stream inlet and said reactant stream outlet.

10. The method of claim 6 wherein said reactant stream further comprises oxygen and wherein either or both of said first and second oxygen-containing gas streams is drawn from said reactant stream.

* * * * *